United States Patent [19]
Yamato

[11] Patent Number: 5,189,824
[45] Date of Patent: Mar. 2, 1993

[54] FISHING ROD

[75] Inventor: Yoshiro Yamato, Shimonoseki, Japan

[73] Assignee: Shimano, Inc., Osaka, Japan

[21] Appl. No.: 801,391

[22] Filed: Dec. 2, 1991

[30] Foreign Application Priority Data

Dec. 1, 1990 [JP] Japan .................. 2-400011[U]

[51] Int. Cl.$^5$ ............................................ A01K 87/06
[52] U.S. Cl. ................................................ 43/22; 43/18.1
[58] Field of Search ...................... 43/22, 18.1, 20, 23

[56] References Cited

U.S. PATENT DOCUMENTS

| | | | |
|---|---|---|---|
| 2,543,881 | 3/1951 | Umphlette et al. | 43/22 |
| 3,073,055 | 1/1963 | Edwards et al. | 43/23 |
| 4,077,150 | 3/1978 | Barnes | 43/23 |
| 4,646,460 | 3/1987 | Rumbaugh | 43/23 |
| 4,756,114 | 7/1988 | Ohmura | 43/22 |
| 4,918,852 | 4/1990 | Yamato | 43/22 |

FOREIGN PATENT DOCUMENTS 1-155361 10/1989 Japan .

Primary Examiner—Richard K. Seidel
Assistant Examiner—Chuck Y. Mah
Attorney, Agent, or Firm—Dickstein, Shapiro & Morin

[57] ABSTRACT

A fishing rod includes a fixed hood formed on a rod body, a movable hood having an inner threaded portion engageable with a threaded portion of the rod body. The fixed hood and the movable hood together form a reel seat for supporting opposed ends of a foot of a reel. At an inner peripheral face of the movable hood where the one longitudinal end of the reel foot is engaged, there is formed a threaded guide groove having a pitch corresponding to a pitch of the inner threaded portion. And, a contact face is also defined in the inner peripheral face of the movable hood facing the fixed hood. The contact face comes into contact with a terminal edge of the reel foot in a direction substantially normal to an axis of the inner threaded portion.

5 Claims, 2 Drawing Sheets

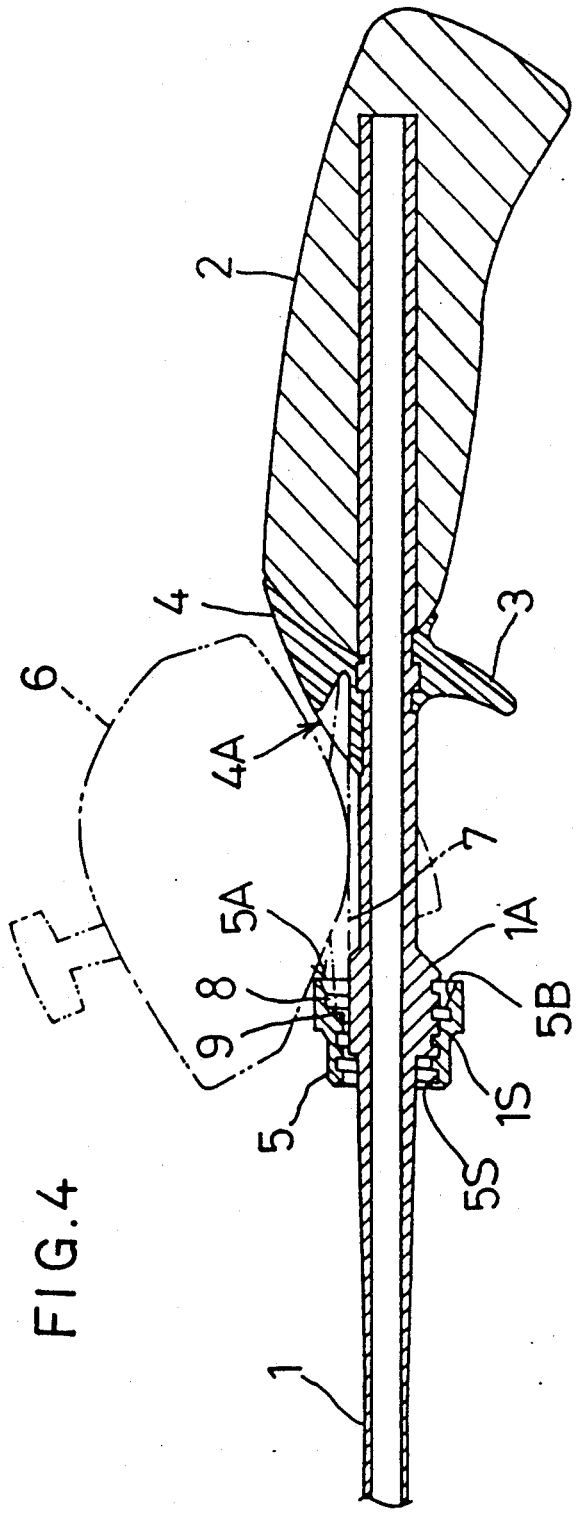
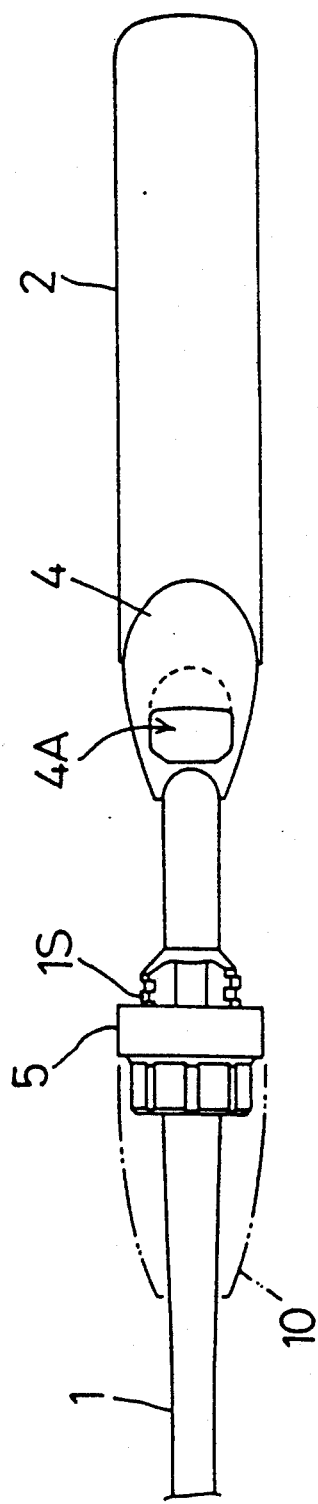
FIG.4
FIG.5

FISHING ROD

BACKGROUND OF THE INVENTION

1 Field of the Invention

The present invention relates to a fishing rod, and more particularly to improvement of a reel seat of a fishing rod.

2 Description of the Related Art

A conventional reel seat of a fishing rod is known from e.g. the Japanese laid-open utility model gazette: Hei 1-155361. This reel seat consists of a fixed hood fixed to the rod and a movable hood which position is adjustable by means of a nut-like ring member engaging with a threaded portion of a fishing rod.

More specifically, with the above-described convention, through displacement of the movable hood relative to the fixed hood by rotation of the ring member, a foot of a reel is fitted to tapered inner faces of the fixed and movable hoods.

The advantage of the screw-feed type reel seat described above is that the reel can be firmy fixed even by rotating the ring member with a small force. On the other hand, the main disadvantage of this conventional construction is that the fixation afforded by the operation of the ring member tends to be excessive as to render detachment of the reel foot from the movable hood difficult.

Further, in case the reel is fixed at an improper position relative to the rod, while the one terminal end of the reel foot is engaged with the fixed hood, the other terminal end of the foot engaged with the inner face of the movable hood remains detached from the rod. Such erroneous engagement makes the attachment of the reel troublesome.

The primary object of the present invention is to provide an improved fishing reel which allows easy attachment and detachment of the reel while maintaining the aforementioned advantage of the screw-feed type reel seat.

SUMMARY OF THE INVENTION

For accomplishing the above-noted object, a fishing rod, according to the present invention, comprises:

a fixed hood formed on a rod body;

a movable hood having an inner threaded portion engageable with a threaded portion of the rod body;

a reel seat including said fixed hood and said movable hood for supporting opposed ends of a foot of a reel;

a threaded guide groove defined at an inner peripheral face of said movable hood where the one end of said reel foot is engaged, said guide groove having a pitch corresponding to a pitch of said inner threaded portion; and a contact face defined in an inner peripheral face of said movable hood facing said fixed hood, said contact face contacting a terminal edge of said reel foot in a direction substantially normal to an axis of said inner threaded portion.

Fuctions and effects of this construction will be described next.

This construction can be embodied as shown in FIGS. 1 through 3. As shown, assuming that a reel 6 is improperly attached to the fishing rod to cause one longitudinal end of a reel foot 7 to contact an inner peripheral face of a movable hood 5, a simple rotary movement of the movable hood 5 can bring this end of the reel foot 7 into engagement with a guide groove 8. With further rotation of the movable hood 5, the longitudinal end of the reel foot 7 is guided along the guide groove 8 to come into contact with a contact face 9.

On the other hand, assuming now that the movable hood 5 is rotated in the fixing direction with the longitudinal end of the reel foot 7 contacting the contact face 9, the fixation of the reel 6 takes place with pressing the reel foot 7 along the axis of the rod body 1.

That is, according to the present invention, the pitch of the guide groove 8 is equated with that of the inner threaded portion 5S, in the attachment of the reel 6, any improper positioning of the reel can be readily corrected without application of distorting force thereto and the reel can be fixed to the rod without being inadvertently locked thereto, unlike the above-described conventional art where such locking tends to occur due to the pressure contact between the tapered faces. Moreover, the construction of the present invention maintains the advantage of the conventional screw-feed type reel seat which allows firm fixation of the reel through a small operation force.

As described above, the present invention has achieved its object of providing an improved fishing reel which allows easy attachment and detachment of the reel while maintaining the advantage of the screw-feed type reel seat.

Further, and other objects, features and effects of the invention will become more apparent from the following more detailed description of the embodiments of the invention with reference to the accompanying drawings.

BRIEF DESCRIPTION OF THE DRAWINGS

FIG. 4 is a section showing a grip portion and its vicinity of the lure fishing rod, and FIG. 5 is a plane view showing the grip portion and its vicinity of the lure fishing rod.

DESCRIPTION OF THE PREFERRED EMBODIMENTS

Figure 1:
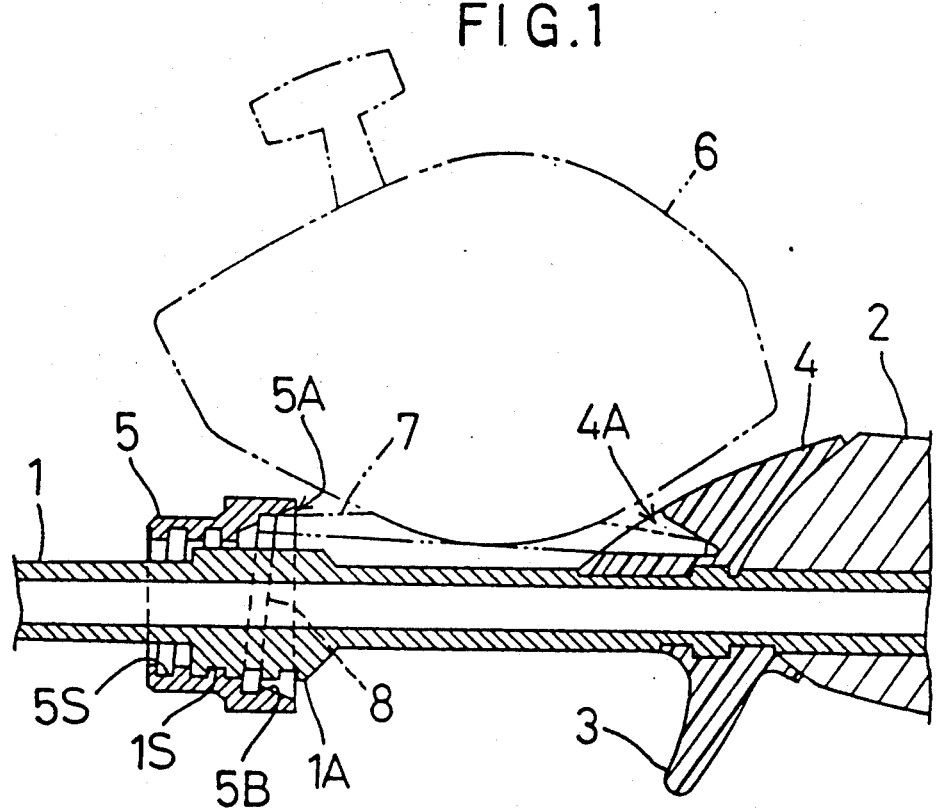
FIG. 1 is a side view in vertical section showing a fishing rod according to one preferred embodiment of the present invention.
Figure 2:
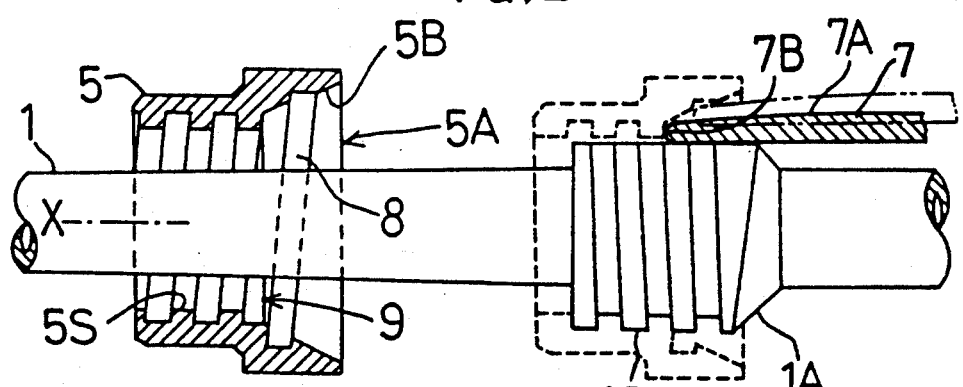
FIG. 2 is an enlarged section of a movable hood of the fishing rod.
Figure 3:
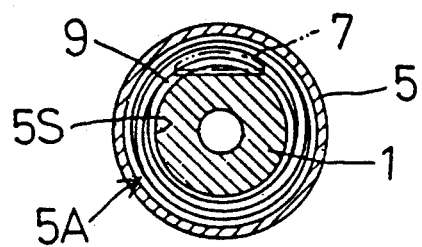
FIG. 3 is a section of the movable hood as seen from a direction along an axis of the fishing rod.

Preferred embodiments of a fishing rod relating to the present invention will be described in particular with reference to the accompanying drawings.

FIGS. 1 through 5 show a reel seat of a lure fishing rod 1 as one embodiment of a fishing rod relating to the present invention.

This lure fishing rod 1 includes a grip 2 at a rear end, a trigger 3 and a fixed hood 4 provided continuously and forwardly of the grip 2 and a movable hood 5 provided further forwardly.

The fixed hood 4 and the movable hood 5 together form a reel seat. With this rod 1, as the movable hood 5 is moved rearwards (i.e. toward the grip 2), forward and rearward ends of a reel foot 7 are fitted into the respective hoods 4, 5 to be supported thereby on the rod 1. Further, for facilitating attachment and detachment of the reel 6 to the fishing rod 1, the movable hood 5 has a unique construction to be described next.

The movable hood 5 includes an inner threaded portion 5S for engagement with a threaded portion 1S formed in a larger diameter portion 1A of the rod 1. The movable hood 5 further defines an opening 5A for introducing the foot 7 of the reel 6, and in an inner peripheral face 5B of this opening 5A there is defined a threaded guide groove 8 having a screw-feeding direction and a pitch both identical to those of the inner threaded portion 5S. Further, in the inner peripheral face of the movable hood 5 facing the fixed hood 4, there is defined a contact face 9 contactable with a terminal face 7B of the foot 7 in a direction substantially normal to an axis X of the inner threaded portion 5S (the axis X corresponds to a longitudinal axis of the rod 1).

The inner peripheral face 5B of the opening 5A has a conical shape with an opening facing the fixed hood 4 and having a slope angle greater than a slope angle of an upper face 7A of the reel foot 7, so that contact between the inner peripheral face 5B and the upper face 7A of the reel foot is prevented when the reel foot is fixed to the rod body and also the foot 7 is firmly stopped at a position where the contact face 9 contacts the terminal face 7B of the foot 7.

For attaching the reel 6 to the rod 1, one longitudinal end of the reel foot 7 is fitted into an opening 4A of the fixed hood 4, while the other longitudinal end of the foot 7 is fitted into the opening 5A of the movable hood 5; and then, the movable hood 5 is rotated in a tightening direction. This simple rotary operation alone, even if the reel 6 is improperly positioned relative to the rod 1, will smoothly feed the end of the foot 7 to the contact face 9. And, as shown in FIG. 1, the reel 6 is attached to the fishing rod 1 with the reel foot 7 being bound from the longitudinally opposed directions by means of the hoods 4, 5.

According to the above-described construction, the upper faces and the side faces of the reel foot 7 do not contact the respective hoods 4, 5 through large contact areas. Thus, even if the movable hood 5 is rotated with a strong force, there will not occur locking of the hood 5 to the rod 1 and the reel 6 can be detached from the rod 1 with ease.

In place of the above embodiment, as denoted by virtual lines in FIG. 5, it is also conceivable to provide, forwardly of the movable hood 5, a cover 10 formed of a foam material. Further, the present invention may be embodied as a casting rod or a saltwater rod. Still further, it is conceivable to form a plurality of guide grooves in the inner peripheral face of the movable hood.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing rod comprising:
    a fixed hood formed on a rod body;
    a movable hood having an inner threaded portion engageable with a threaded portion of the rod body;
    a reel seat including said fixed hood and said movable hood for supporting opposed ends of a foot of a reel;
    a threaded guide groove defined at an inner peripheral face of said movable hood, said guide groove having a pitch corresponding to a pitch of said inner threaded portion and having a minimum inner diameter greater than an inner diameter of said inner threaded portion; and
    a contact face defined in an inner peripheral face of said movable hood facing said fixed hood, said contact face contacting a terminal face of said reel foot in a direction substantially normal to an axis of said inner threaded portion, said contact faced fixedly supporting said reel foot to a rod by urging said terminal face of the reel foot along said axis toward said fixed hood.

2. A fishing rod as defined in claim 1, wherein said movable hood is movable by rotation.

3. A fishing rod defined in claim 2, wherein said threaded portion of the rod body is defined at a larger diameter portion of said rod body, where a leading end of said reel foot positioned on a side of a top of the fishing rod is inserted into said movable hood.

4. A fishing rod as defined in claim 2, wherein a cover is provided forwardly of said movable hood.

5. A fishing rod as defined in claim 2, wherein said inner peripheral face of an opening defined in said movable hood has a conical shape with an opening facing said fixed hood and having a slope angle greater than a slope angle of an upper face of said reel foot, so as to prevent contact between said inner peripheral face and said upper face of the reel foot when said foot is fixed to said rod body.

* * * * *